US012570828B2

(12) United States Patent
Brandsvoll et al.

(10) Patent No.: US 12,570,828 B2
(45) Date of Patent: Mar. 10, 2026

(54) CHARCOAL PRODUCTS MADE WITH PHENOLIC RESIN BINDER AND METHODS FOR MAKING THEREOF

(71) Applicant: ProCarbon Bio AB

(72) Inventors: Ralph Brandsvoll, Andoya (NO); Rahmeen Parviz Farudi, Asunción (PY)

(73) Assignee: ProCarbon Bio AB, Alingsas (SE)

( * ) Notice: Subject to any disclaimer, the term of this patent is extended or adjusted under 35 U.S.C. 154(b) by 0 days.

(21) Appl. No.: 18/560,641

(22) PCT Filed: May 16, 2022

(86) PCT No.: PCT/EP2022/063215

§ 371 (c)(1),
(2) Date: Nov. 13, 2023

(87) PCT Pub. No.: WO2022/238586

PCT Pub. Date: Nov. 17, 2022

(65) Prior Publication Data

US 2024/0209178 A1 Jun. 27, 2024

(30) Foreign Application Priority Data

May 14, 2021 (NO) .................................... 20210607

(51) Int. Cl.

| | |
|---|---|
| ***C08K 3/04*** | (2006.01) |
| ***C04B 14/02*** | (2006.01) |
| ***C04B 18/02*** | (2006.01) |
| ***C04B 24/30*** | (2006.01) |
| ***C08K 5/3477*** | (2006.01) |
| ***C08L 61/06*** | (2006.01) |
| ***C10L 5/14*** | (2006.01) |
| ***C10L 5/36*** | (2006.01) |
| ***C25C 3/00*** | (2006.01) |
| ***H01M 4/62*** | (2006.01) |

(52) U.S. Cl.

CPC .............. *C08K 3/04* (2013.01); *C04B 14/022* (2013.01); *C04B 18/022* (2013.01); *C04B 24/302* (2013.01); *C08K 5/3477* (2013.01); *C08L 61/06* (2013.01); *C10L 5/14* (2013.01); *C10L 5/361* (2013.01); *C25C 3/00* (2013.01); *H01M 4/621* (2013.01); *H01M 4/625* (2013.01)

(58) Field of Classification Search

CPC . C10L 5/14; C10L 5/261; C10L 5/361; C04B 18/022; C04B 14/022; C25C 3/12

See application file for complete search history.

(56) References Cited

U.S. PATENT DOCUMENTS

| | | | |
|---|---|---|---|
| 4,981,494 | A | 1/1991 | Breuil |
| 5,221,290 | A | 6/1993 | Dell |
| 5,298,040 | A | 3/1994 | Gosset |
| 10,494,580 | B2 | 12/2019 | Cui |
| 2007/0132129 | A1 | 6/2007 | Witzke |
| 2012/0128817 | A1 | 5/2012 | Mochizuki |
| 2016/0060493 | A1 | 3/2016 | Grün |
| 2016/0184898 | A1 | 6/2016 | Kohav |
| 2017/0283686 | A1 | 10/2017 | McDaniel |

FOREIGN PATENT DOCUMENTS

| | | | | | |
|---|---|---|---|---|---|
| CN | 101143788 | A | | 3/2008 | |
| CN | 101285199 | A | * | 10/2008 | ............... C25C 3/12 |
| CN | 103805302 | A | | 5/2014 | |
| CN | 104289205 | | | 1/2015 | |
| CN | 108034473 | | | 5/2018 | |
| CN | 109400163 | | | 3/2019 | |
| CN | 110395941 | A | | 11/2019 | |
| CN | 111205797 | | | 5/2020 | |
| CN | 112125306 | A | | 12/2020 | |
| CN | 113603488 | A | * | 11/2021 | ............... C25C 3/12 |
| EP | 2791248 | B1 | | 10/2014 | |
| FR | 870104 | A | * | 2/1941 | ................ C10L 5/14 |
| GB | 2066820 | A | * | 7/1981 | ........... C07C 37/004 |
| KR | 960005313 | B1 | * | 4/1996 | ............... E04B 2/90 |
| KR | 2006028132 | A | * | 3/2006 | ............... E04C 2/10 |
| KR | 20120051725 | | | 5/2012 | |
| NO | 168310 | B | * | 10/1991 | ............. C10B 55/00 |
| NO | 313511 | B1 | | 4/2001 | |
| WO | WO-9910293 | A1 | * | 3/1999 | ............ C04B 26/10 |
| WO | 2010077141 | A1 | | 7/2010 | |

(Continued)

OTHER PUBLICATIONS

Sarika (Bio-Based Alternatives to Phenol and Formaldehyde for the Production of Resins, Polymers, 2020, 12, 2337, 24 pages).*
Srivastava (Mechanical, chemical and curing of cardanol-furfural-based novolac resin for application in green coatings., J. Coat. Tech. Res., 2015, 12(2), pp. 303-311).*
Machine translation of KR 2006028132 (2006, 5 pages).*
Machine translation of KR 960005313 (1996, 4 pages).*
Machine translation of FR 870104 A (1941, 5 pages).*
Machine translation of CN101285199 (2008, 4 pages).*
Machine translation of CN 113603488 (2021, 8 pages).*
MatWeb (Plywood, MatWeb Material Property Data, 2024, p. 1).*
The Brick Industry (Technical Notes 3A-Brick Masonry Material Properties, The Brick Industry Association, 1992, 10 pages).*
Machine translation of NO 168310 (1991, 10 pages).*

(Continued)

*Primary Examiner* — Brieann R Johnston
(74) *Attorney, Agent, or Firm* — Jeffrey N. Townes; Cozen O'Connor

(57) ABSTRACT

The present disclosure describes compositions (bio-carbon materials) and methods of making compositions that comprise a binder (such as a phenolic binder which may comprise cardanol) and charcoal, preferably in a powder form. The composition may also include an accelerator/catalyst. The binder, charcoal powder, and accelerator may be mixed together, formed (pressurized, rolled, or extruded) and then cured. The resulting composition may be used as a metallurgical reducing agent, processed into anodes for use in the metallurgical industry, used in the construction industry for example as an ingredient in concrete, and as a fuel for cooking.

14 Claims, 5 Drawing Sheets

(56) References Cited

FOREIGN PATENT DOCUMENTS

| | | |
|---|---|---|
| WO | 2018203829 A1 | 11/2018 |
| WO | 2019180235 | 9/2019 |

OTHER PUBLICATIONS

Mary C. Lubi et al. "Cashew nut shell liquid (CNSL)—a versatile monomer for polymer sythesis" Designed Monomers and Polymers, vol. 3, No. 2, Jun. 1, 2000. ISSN1385-772X.

Dashtizadeh et al, "Thermal and Flammability Properties of Kenaf/ Recycled Carbon Filled with Cardanol Hybrid Composites", Sep. 5, 2019, International Journal of Polymer Science, vol. 2019.

Mahata et al, "Self-assembled cardanol azo derivatives as antifungal agent with chitin-binding ability", May 14, 2014, International Journal of Biological Macromolecules 69.

Sawadogo et al, "Cleaner production in Burkina Faso: Case study of fuel briquettes made from cashew industry waste", May 29, 2018, Journal of Cleaner Production, vol. 195, pp. 1047-1056.

Mgaya et al, "Cashew nut shell: a potential bio-resource for the production of bio-sourced chemicals, materials and fuels", Jan. 9, 2019, Green Chem., 2019,21, 1186-1201.

Voirin et al, "Functionalization of cardanol: towards biobased polymers and additives", Oct. 4, 2013, Polymer Chemistry, 2014, 5,3142-3162.

Castro-Diaz et al, "Evaluation of demineralized lignin and lignin-phenolic resin blends to produce biocoke suitable for blast furnace operation", Sep. 3, 2019, Fuel 258 (2019) 116-125.

Bobade et al, "Bio-Based Thermosetting Resins for Future Generation: A Review", May 31, 2016, Polymer-Plastics Technology and Engineering, vol. 55, pp. 1863-1896.

Mrad et al, "Mechanical and Microstructure Properties of Biochar-Based Mortar: An Internal Curing Agent for PCC", Ap. 28, 2019, Department of Civil and Environmental Engineering, American University of Beirut.

Cakbentra, CNSL and Charcoal Briquette Production From Cashew Nut Shells, Biomass Industrial Innovative Projects, Dec. 5, 2019.

* cited by examiner

Break Pattern in cylinders of bio-carbon material

CHARCOAL PRODUCTS MADE WITH PHENOLIC RESIN BINDER AND METHODS FOR MAKING THEREOF

CROSS-REFERENCE TO RELATED APPLICATIONS

This Patent Application ______, takes priority from PCT Patent Application No. PCT/EP2022/063215, having a 371 (c) date of May 14, 2021, titled Charcoal Products Made With Phenolic Resin Binder And Methods For Making Thereof, the contents of which are expressly incorporated herein by this reference as though set forth in their entirety and to which priority is claimed.

FIELD OF USE

The present disclosure relates generally to agglomerates, carbon-based materials, charcoal compositions, charcoal products, and methods of making charcoal products, especially high-performance carbon products by using charcoal and a binder. More specifically, the present disclosure relates to materials formed from "captured" carbon such as charcoal and from a binder, as well as to a corresponding process of making such materials. The products made from these compositions may be used as fuel, as a reducing agent in the metallurgical industry to replace the use of fossil fuels that are currently being used, and/or to create carbon dioxide neutral products for many potential uses including as filler materials in concrete, asphalt and other construction materials and as anodes for the aluminum industry.

BACKGROUND

Climate change is an increasing concern to governments and individuals and increasing efforts are being made and proposed to use less fossil-fuel based carbon sources and more "CO2 Neutral" carbon sources. The simplest form of "carbon capture" is to use biomass-based carbon sources such as wood or processed wood materials such as charcoal. Carbon dioxide neutral carbon sources rely on carbon previously captured from the atmosphere and so do not contribute to atmospheric carbon even if that carbon is subsequently released. In "carbon capture", atmospheric carbon is captured and stored away from the atmosphere for a significant period so as to provide a net reduction in atmospheric carbon. Similarly, a process which generates CO2 may be "offset" if the resulting product serves also to sequester carbon away from the atmosphere for a long period. Products generated using charcoal from biomass have the potential to store atmospheric carbon and so provide a carbon-neutral substitute for previous fossil fuel-derived carbon sources. They may furthermore be used to offset the carbon dioxide generated in making certain materials, such as cement, if those materials can be used to store that carbon for long periods.

Products generated from carbon and a binder material have been known for some time. Numerous improvements in the field of bound charcoal materials, many of them patentable and many of them eco-friendly, have been made since 1939. U.S. Pat. No. 5,298,040, discloses the use of water-soluble oxidizers to water-proof fuel briquettes. U.S. Pat. No. 5,221,290 discloses the use of clay and an organic binder. Hundreds of patents have been granted in this field. Each of them, however, has deficiencies and a need remains for high-performance bio-carbon based materials that can substitute for fossil carbon products (e.g. coke and fossil carbon fuels) and/or be used in the sequestration of bio-carbon away from the atmosphere.

There is, thus, a need in the art for a composition and method of making that composition that provides an eco-friendly and/or high-performance bio-carbon material that can be used for many purposes. Within the metallurgical industries as a reductant, to make bio-carbon anodes, in construction industries as a "bio-carbon stone" to reduce the carbon footprint of building materials, and/or in the BBQ industry to drastically improve performance over current BBQ briquette fuels.

SUMMARY

To minimize the limitations in the cited references, and to minimize other limitations that will become apparent upon reading and understanding the present specification, the present specification discloses bio-carbon-based materials, and methods for creating these materials, that comprise charcoal, and at least one binder material.

In a first aspect, the present disclosure thus provides a bio-carbon based material comprising charcoal and at least one binder comprising a phenolic resin. The binder component may comprise at least 50% (e.g. 50 to 100%) phenolic resin, such as at least 75% or at least 90% phenolic resin (all % by weight).

In one embodiment, the phenolic resin may be formed or formable from at least one phenol of formula I:

I

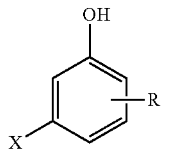

wherein X is H or OH and R is H or an optionally substituted, saturated or unsaturated, hydrocarbon moiety of 1 to 24 carbons, which may be straight-chain or branched. One or two independent R groups may be present and may independently be in the position ortho-, meta- or para- to the —OH group shown. One meta-R group is preferred. In one embodiment, the at least one phenol of formula I comprises at least one phenol wherein R is not hydrogen.

The at least one phenol of formula I may comprise, consist essentially of or consist of phenols of formula I wherein at least one non-hydrogen R group is present, preferably meta- to the —OH moiety.

In one embodiment, the at least one phenol of formula I may partially comprise phenols of formula I wherein at least one non-hydrogen R group is present, preferably meta- to the —OH moiety and partially comprise phenol and/or resorcinol.

In one embodiment, the phenolic resin may be a polymer of at least one phenol of formula I optionally with other components (such as those described herein, for example a formyl carbon source such as hexamine).

In one embodiment, the phenolic resin may be formed or formable from at least one phenol of formula I where the at least one phenol comprises cardol and/or cardanol.

In one embodiment, the phenolic resin may be formed or formable from at least one phenol of formula I by reaction with at least one aldehyde, urea or a formyl-carbon source such as hexamine.

In one embodiment, the bio-carbon based material may contain up to 30% by weight (e.g. 1 to 30% by weight) of a mineral filler such as sand or rock flour.

In a second aspect, the present disclosure provides a bio-carbon based material comprising charcoal and at least one binder where the bio-carbon based material has a compression strength of at least 5 MPa (e.g. 5 to 150 MPa, preferably at least 20 MPa, such as at least 30 MPa or at least 40 MPa) when tested in accordance with the method described below (as described herein below with reference to the examples). In one particular embodiment, the bio-carbon based material has a compression strength of at least 40 MPa (e.g. 40 to 120 MPa), preferably at least 50 MPa and more preferably at least 60 MPa (e.g. 60 to 100 MPa). One appropriate test for measuring the compressive strength of the bio-carbon material is the American Society for Testing Materials ASTM C39/C39M method. This provides a Standard Test Method for Compressive Strength of Cylindrical Concrete Specimens. This method for testing compressive strength is intended herein unless otherwise specified.

In a further aspect, the present disclosure provides a method for the formation of a bio-carbon based material, said method comprising mixing charcoal, at least one binder material, and, optionally, an accelerator or catalyst, and forming the mixture into any desired shape (e.g. into blocks, rods or briquettes). The resulting products may be used in any manner, including, but not limited to: the metallurgical industry as highly uniform bio-carbon based reducing agent; creating bio-carbon based anodes for the aluminum industry; the construction industry, particularly as a total or preferably partial replacement for rocks or gravel in concrete, asphalt or other composites; and/or as a fuel for cooking in the BBQ industry.

One embodiment may be making a heat or energy rich solid fuel materials such as briquettes. This material may be made from charcoal, preferably charcoal powder, and using phenolic resin as the binder. A highly suitable binder for this embodiment is cardol and/or cardanol.

In various embodiments the bio-carbon material of the present disclosure may have fixed carbon (i.e. percentage of non-volatile carbon by weight) in the range of 2 to 99%. Preferably, the fixed carbon is at least 60% or at least 75% by weight. This will vary depending upon the nature of the charcoal and binder, the conditions under which the charcoal is made and/or treated and the curing and optional second heat treatment of the bio-carbon material. Charcoal having a fixed carbon content of at least 70% (e.g. 75 to 98%) may be used. In one embodiment, the charcoal used in the bio-carbon material has a fixed carbon content of at least 80%. Such charcoal may, for example, be generated by heat treatment in the absence of oxygen to 300-900° C. In a further embodiment, the charcoal used may be at least 80%, at least 90% or at least 95% fixed carbon. Such charcoal may, for example, be generated by heat treatment to at least 700° C. (e.g.) 800-1200° ° C. in an inert atmosphere.

The composition may include a catalyst and/or accelerator to improve the curing time, lower the curing temperatures and/or control the nature of the binder.

In one embodiment, the accelerator or catalyst may be hexamine, which may start the polymerization process when mixed with the other binder components (e.g. phenols of formula I) and charcoal powder. Aldehydes such as formaldehyde and their precursors such as polymethylene glycol are also suitable accelerators or catalysts. Further accelerators and catalysts are discussed below and may be used in any appropriate embodiment of the invention.

In one embodiment, the bio-carbon material (e.g. briquettes) may be cured in the range of 150 to 400 degrees centigrade ("° C."). Preferably this will be 180 to 250° C. such as 190 to 220° C. The curing period will depend upon the binder, the optional accelerator/catalyst and the treatment temperature. However, typical curing periods will be from 5 minutes to 12 hours, preferably from 20 minutes to 3 hours, such as 30 minutes to 2 hours.

In one embodiment, the pressure used in forming the bio-carbon material into pieces (e.g. into briquettes, blocks, rods or any appropriate shape, including those discussed herein) may beat least 5 kN/cm2 (i.e. at least 50 MPa) such as 5 to 500 kN/cm2 (50 to 5000 MPa). Suitable compression forces may be, for example, at least 8 kN/cm2, such as around 10 kN/cm2. However, greater compression such as at least 20 N/cm2 (200 MPa) or at least 50 N/cm2 may be used. Vibration may alternatively or additionally be used to compress and/or compact the products of the disclosure prior to curing. In one embodiment, vibration is used in combination with the compression forces indicated above.

Typically higher compression forces (preferably in combination with vibration) are associated with final materials having a greater density, lower surface area, lower water adsorption and/or a stronger compressive strength. Repeated compression, optionally in combination with vibration, may also be used. Compression may be carried out once, twice, three times or a larger number of times (e.g. 1 to 10 times). Vibration may be used or not used during each compression step independently.

Where the bio-carbon material of the present invention is in the form of briquettes, these may be used for any appropriate purpose including as fuel for cooking, such as in the BBQ industry. Bio-carbon briquettes may also be used as reductant in metallurgical processes.

In one embodiment, the charcoal and binder mixture may be pressurized by a hydraulic press, a mechanical press, an extruder, and/or a roller press, and may have a pillow, prismatic (e.g. cuboidal or cylindrical), or other uniform shape. Formation by extrusion is a preferred method.

In one aspect of the invention, the bio-carbon material may have a compression strength of more than 50 MPa (more than 505 kg/cm2). This strength is far greater than previous bio-carbon material, such as known charcoal briquettes. Due to this compression strength, the bio-carbon material; in addition to being very useful as a fuel, as a reducing agent in the metallurgical industry and as carbon electrodes (e.g. anodes) for many industrial processes, such as smelting of aluminium; may be reduced to a size similar to that of stones or pebbles (aggregate) commonly used in construction materials (e.g. concrete) and be used as a (especially partial) substitute for such stones (aggregate) without materially impacting the overall strength of the resulting product (e.g. the resulting concrete).

Thus, in a further aspect, the present disclosure provides a concrete comprising cement (e.g. Portland cement) and at least one bio-carbon material as described herein. Such a concrete may comprise the bio-carbon material of the present disclosure, formed, moulded, cut or broken (e.g. crushed) into pieces. Such pieces are referred to herein as "charcoal stones".

Preferably, these "charcoal stones" may have a size similar to standard aggregates for use in concrete. This may be, for example, an average of around 4 to 40 mm (e.g. 8 to 40 mm) diameter for course aggregate (e.g. between 15 and 30 mm diameter on weight average). An alternative of around 40 mm weight average diameter (e.g. 35 to 45 mm average) is also appropriate. Fine aggregates having a weight average diameter of no more than 10 mm (e.g. a maximum diameter of around 9.55 mm) may also be appropriate.

The concrete of the present disclosure may contain any suitable amount of charcoal stones (bio-carbon material of the present invention) but this will advantageously be at least around 100 kg (e.g. 80 to 300 kg or 100 to 300 kg, such as 100 to 200 kg) for each cubic metre of concrete. This renders the concrete approximately "carbon neutral" as discussed herein. Amounts greater than 100 kg per cubic metre may be used in order to effectively sequester carbon from the atmosphere and lock that carbon away in a long-term storage medium. Alternatively, the atmospheric carbon impact of a material such as concrete may be reduced without needing to fully offset the carbon dioxide released in production. Amounts of at least 20 kg charcoal stones per cubic metre, preferably at least 50 kg (such as 50 to 120 kg per cubic metre) may partially or fully offset the carbon dioxide released in manufacture of building materials such as concrete. Concrete having these levels of carbon stones thus forms a further embodiment.

The concrete of the present disclosure may be used in standard industry concrete (such as, for use in sidewalks, industrial, residential or office buildings, bridges, sidings, large diameter pipes, roads, tunnels and/or pavements amongst many other uses).

Many standards for concrete compression strength exist. The bio-carbon material of the present disclosure may be used in any appropriate concrete. Standard concrete strength varies from around 7.5 MPa for kerb bedding and drainage works up to 50 MPa and over for agricultural and industrial reinforced concrete. In one embodiment, the concrete of the present disclosure comprises charcoal stones having a strength at least as high as the nominal 28-day strength of the standard concrete in which they are used.

By adding the charcoal stones of the present disclosure into a concrete mix, the carbon dioxide footprint of the concrete can be controlled, shrinking the carbon dioxide footprint, making it carbon dioxide neutral, or even carbon dioxide negative depending on the amount of charcoal stones included in the concrete mix. By adding the charcoal stones of the present disclosure to concrete, the carbon dioxide captured from the atmosphere and contained as carbon with the stones will be bonded at approximately a 1:3 ratio (12 kg of elemental carbon is equivalent to 44 kg of CO2). This means that for every 1 kg of charcoal stones added, approximately 3 kg (up to 3.6 kg for pure carbon material) of carbon dioxide is prohibited from entering the atmosphere. Since manufacture of a cubic metre of cement releases around 300 kg of carbon dioxide, incorporation of around 100 kg of carbon in the form of charcoal stones (e.g. 80 to 150 kg/m3) sequesters a similar amount of carbon away from the atmosphere for long periods and so may render the cement "carbon neutral". Such a period may be tens or hundreds of years (e.g. 100 to 500 years) since even when the concrete reaches the end of its useful life it may be buried or crushed and used as hard-core or filler in future materials (such as future concrete) and so continue to trap carbon away from the atmosphere. Smaller amounts of charcoal stones (e.g. 10 to 99 or 10 to 120 kg/m3) may be included in the concrete where reduction or partial offsetting of the carbon release is desirable or where lesser amounts of Portland cement need to be offset or lesser amounts of standard aggregates are required in the mix. Similarly, larger amounts of charcoal stones (e.g. 150 to 250 kg/m3) may be used to offset the carbon dioxide released in manufacturing mixes having a higher level of carbon release (e.g. having more Portland cement) or where an overall removal of carbon from the atmospheric is desired.

In one embodiment, the present disclosure thus provides a "carbon neutral" concrete wherein the carbon dioxide released in the formation of the concrete (especially in the formation of the cement binder in the concrete, such as Portland cement) is at least offset by the captured carbon contained in the charcoal stones entrained within the concrete. Preferably the carbon neutral cement will be a cement in which 100±20% (such as 100±10%) of the amount of carbon released into the atmosphere during the formation of the concrete is entrained within the concrete in the form of captured carbon within charcoal stones. In a further embodiment, the present disclosure thus provides a "carbon negative" concrete wherein the carbon dioxide released in the formation of the concrete (especially in the formation of the cement binder in the concrete such as the Portland cement) is more than offset by the captured carbon contained in the charcoal stones entrained within the concrete. Preferably the carbon negative cement will be a cement in which at least 100% (such as 100 to 500%) of the amount of carbon released into the atmosphere during the formation of the concrete is entrained within the concrete in the form of captured carbon within charcoal stones. Such carbon neutral and/or carbon negative concrete may form a valuable tool in reducing the carbon released by the construction/building industry and/or in sequestering carbon away from the atmosphere for many decades.

In one embodiment, the binder may be approximately 2-50% weight of the final mixture (and thus of the final bio-carbon material). This will preferably be 5 to 30% by weight. The amount of binder may vary depending upon the application with higher compression strength generally requiring higher amounts of binder. For briquettes for use as reducing agents in metallurgical processes or as fuel, the amount of binder may typically be 2 to 15% or 5 to 10% by weight of the bio-carbon material. Where strength is of greater importance, such as forming "charcoal stones" for use in construction materials or for forming anodes for aluminium manufacture, higher levels of binder, such as 15 to 25% or 20 to 30% by weight.

The "binder" as indicated herein may comprise at least one phenol component (such as those described herein, especially of formula I) but may also comprise at least one accelerant and/or catalyst. Accelerants such as hexamine (and others described herein and known in the art) preferably may be present at approximately 4 to 10% (e.g. 6-8%) by weight of the binder component. In one embodiment, the accelerant is a source of formyl carbons and is present in an amount equivalent to at least one mole of formyl carbon per mole of phenol present in the binder.

In addition to the optional accelerator/catalyst, the binder component may comprise at least one oil component. Such an oil forms an optional part of the binder and my thus be absent or may be present as up to 50% of the total weight of binder (i.e. up to approximately the same content by weight as the phenol component). Suitable oils include "drying oils". Drying oils typically comprise glycerol triesters of highly unsaturated fatty acids, especially alpha-linolenic acid. The "iodine number" is an indicator of the number of double bonds in an oil and thus its tendency to be a drying oil. Oils with an iodine number greater than 130 are considered drying and are preferred as the oil component in the present invention. Those with an iodine number of 115-130 are semi-drying and may be used, preferably in combination with a drying oil. One preferred drying oil is linseed oil. Such oils dry by oxidative cross-linking and without being bound by theory, may cure with unsaturated phenolic components by such a process. In one embodiment, an oil component is used in combination with at least one phenol of formula I having an unsaturated "R" group. Examples include cardanol and cardol.

One embodiment may be a composition comprising: cardanol (and optionally cardol); and charcoal powder; wherein the cardanol and the charcoal powder are mixed together to form a mixture; and wherein the mixture is cured to form a bio-carbon material. The composition may further comprise an accelerant or catalyst, wherein the accelerant/catalyst is mixed together with the cardanol and the charcoal powder as part of the mixture. The mixture may be compressed, and if compressed, it may be compressed with a pressure in a range of approximately 5 to 500 kN/cm2 (50 to 5000 MPa) such as 5 to 100 kN/cm2. Suitable pressures are described herein such as in the range of 10 to 50 kN/cm2. The mixture may preferably be cured at less than 450° C. Suitable curing temperatures may be in the range of approximately 150 to 300° C., such as 180° C. to 250° C. The curing time can vary, but may be for as little as 1 minute, approximately 2 hours, or longer. Suitable curing times are described herein but may be, for example, 5 minutes to 2 hours, such as 15 minutes to 1 hour.

In any embodiment of the disclosure, the mixture may be cured via a curing mechanism selected from the group of curing or heating mechanisms consisting of one or more of: indirect heat; direct heat; radiant heat; ultraviolet light; infrared rays; microwaves; ultrasound; inductive power; and combinations thereof. Direct heating, such as electrical heating, forms a preferred curing method.

The compressed mixture may be cured directly into its final shape (e.g. formed into briquettes, cylinders, rods, blocks, cubes, balls or prisms before curing). Alternatively the mixture may be formed into its final shape after curing by any appropriate means, such as cutting, grinding or crushing. Briquettes may be a suitable shape for use as a metallurgical reducing agent or as fuel. Alternatively, the biocarbon material may be formed and/or further processed into any appropriate form. Further processing may include shaping the bio-carbon material such as by cutting and/or crushing, or by subsequent treatment such as further curing, coating or heat treatment of the type typically used for conventional carbon anodes for aluminium production (known as Second Heat Treatment or SHT). For charcoal stones, the bio-carbon material may initially be formed into pieces (e.g. standard dimension blocks) and after curing be crushed (e.g. by a jaw crusher) and sieved into desired grades for use as aggregates (e.g in concrete).

Regarding pet-coke anodes for the aluminium industry and all the other metallurgical companies using anodes made from fossil resources, the entire metallurgical industry has been searching for years for ways to reduce their carbon dioxide footprint. Typical anodes are made from pet-coke and have coal pitch added as a binder. Coal pitch and pet-coke use and release a massive amount of carbon dioxide. Thus, there is a long-felt need in the art for a new raw material and binder for use in the manufacturing of metallurgical anodes that uses and releases less carbon dioxide.

Uses of the bio-carbon material may include use in anodes for use in the metallurgical industry, particularly for metal production such as aluminium production. The bio-carbon material of the present invention offers considerable advantages over existing carbon anodes, which typically require a curing temperature of over 1000° C. for long periods, but are also formed from fossil carbon. As a result of this and other factors, up to around hundreds of kilogrammes of fossil carbon (including around 400 Kg of fossil carbon anode) is released into the atmosphere as carbon dioxide in the production of 1000 kg of aluminium. This means that up to around 6 tons of carbon dioxide is released in the manufacture of each ton of aluminium (at 2014 levels). There is thus a considerable need to reduce the fossil carbon utilisation in aluminium manufacture. In one embodiment, the bio-carbon material of the present disclosure is in the form of an anode. In certain embodiments, such anodes may be made without the need for treatment at very high temperatures and/or without heat treatment for long periods. Current petcoke anodes may be treated at temperatures above 450° C. for periods around 8 days) It is thus preferable if lower temperatures (e.g. below 450° C.) and/or shorter heating times (especially less than 1 day) are possible. In particular, where the charcoal has been heated to a high temperature before mixing with the binder and/or where the binder is made utilizing certain additives (as described herein such as ionic liquids) treatment at high temperatures may not be necessary in forming anodes. In one embodiment, the disclosure therefore provides a carbon anode formed from the bio-carbon material of the present disclosure without heat treatment above 450° C. In an alternative embodiment, the bio-carbon material of the present invention may be subjected to Second Heat Treatment (SHT). SHT may be carried out by known methods but will typically involve heating the bio-carbon material of the present disclosure in an inert atmosphere to a temperature in the range 800 to 1500° ° C., such as 1000 to 1200° C. The heating period will preferably be shorter than 300-400 hours typically required for conventional petroleum pitch/coke anodes. In one embodiment, SHT is carried out for no more than 72 hours (e.g. 2 to 72 hours), preferably no more than 48 hours or no more than 24 hours. In one embodiment, SHT is conducted on products (e.g. anodes, briquettes or other products such as those described herein) formed of the bio-carbon material of the present disclosure until the volatiles present in the product are less than 3.5% (e.g. 3.5 to 0.1%) by weight. Higher levels of volatiles may be permitted for certain industries such as steel production. Shorter SHT or no SHT may be possible in some cases where volatiles must be low (e.g. below 5% or below 3.5%) depending upon the charcoal, binder and heating combination used. Cardanol, cardol and other long-chain phenols (e.g. of Formula I with R comprising at least 8 carbons) may have low volatiles and in certain cases require reduced heat treatment (such as described herein).

The bio-carbon material of the present invention may also be used as partial substitute for the standard petroleum coke in anode production. In such an embodiment, at least 50% of the carbon in an anode may be from captured carbon (bio-carbon) with the remainder from fossil sources. The binder in such anodes may be the usual pitch binder or more preferably an organic binder (such as described herein) and/or inorganic binder Such products of the present invention formed from partially bio-carbon material (e.g. at least 50% captured carbon) may also be used as reducing agents and in the other various embodiments described herein.

The products and methods of the present disclosure are not obvious in view of what was practiced before because the entire metallurgical and construction industries have been searching for decades for carbon neutral solutions. Others would have already been practicing the methods of the present disclosure for years if it were obvious.

The cured and pressurized mixture (bio-carbon material) may be used as one of the ingredients to make concrete, as described herein. This may preferably be "carbon-neutral concrete". In such a use, the bio-carbon material may be formed or processed into appropriate aggregate, gravel or pebble-sized pieces (see above). This forming may be by breaking the formed material into smaller pieces such as by use of a jaw crusher. In one embodiment, the bio-carbon material may be formed into high-performance materials such as anodes for the metallurgical (especially aluminum) industry and those items which do not reach the required tolerance may be broken into appropriate pieces for use as charcoal stones in concrete or similar materials (e.g. asphalt) or recycled into new anodes.

In general for the bio-carbon material of the disclosure, the binder (e.g. cardanol and/or cardol optionally including an accelerator) in the mixture may be in a range of approximately 2% to 50% by weight of the final material/mixture. Typically this may be 5% to 30%, such as 8% to 24% by weight. For carbon anodes this may be 10 to 30% such as 15 to 25% by weight.

The charcoal powder in the general mixture may be in a range of approximately 10% to 98% by weight of the mixture. More typically, at least 20%, preferably at least 40% and more preferably at least 50% of the material will comprise charcoal. For use in anodes and certain other uses, the level of volatiles in the charcoal powder may be maintained at a low level. Thus, in one embodiment, the level of volaties in the charcoal may be less than 5% (e.g. 0.1 to 5%), preferably below 3%.

The catalyst/accelerator, which is preferably hexamine, in the mixture may be in a range of 0.1% to 15% by weight volume of the binder. Suitable amounts are described herein.

In one embodiment, the charcoal powder may be pure charcoal powder, such that the bio-carbon material consists of, or consists essentially of, charcoal and binder (optionally including accelerator). Such charcoal may have reduced volatiles as described herein. In an alternative embodiment, at least one mineral filler may be present. Preferably the bio-carbon material will contain (e.g. be formed from) not more than 30% mineral filler by weight. This may be 0 to 30% or 1 to 30% such as 10 to 25% or 15 to 25% filler by weight. The mineral filler may serve to increase the compressive strength of the bio-carbon material and/or may be used to control the density of the material. In particular, for certain applications such as for use in concrete, it may be an advantage to increase the density of the bio-carbon material. This may aid incorporation into mixtures such as cement or asphalt. Suitable mineral fillers include those disclosed herein below and may include materials such as rock flour (very fine rock particles such as those produced by drilling or grinding rock) such as granite flour, silicon powder or fine sand. Preferred filler particle sizes may be in the range 50 nm to 500 μm diameter, such as 100 nm to 200 μm, such as 3 to 100 μm. Very fine fillers such as those having average particle diameters below 100 μm (e.g. 100 nm to 80 μm or 1 to 50 μm) may also be used.

Another specific embodiment may be a composition comprising: cardanol (optionally including up to 12% cardol); charcoal powder; and hexamine; wherein the cardanol, the charcoal powder, and the hexamine are mixed together to form a mixture; wherein the mixture is cured at a range of approximately 180° C. to 250° C. for a period of 1 to 2 hours; wherein the mixture is compressed in a range of approximately 3 to 50 kN/cm2 (prior to curing); wherein the cardanol is in a range of approximately 8% to 35% (e.g. 8 to 20%) by weight of the mixture; wherein the charcoal powder is in a range of approximately 50% to 92% by weight of the mixture; and wherein the catalyst/accelerator (e.g. hexamine) is in a range of 0.1% to 20% (e.g. 0.1 to 15%) by weight of the cardanol/cardol component. All descriptions herein appropriate to the various features of this embodiment may be employed and combined with this embodiment, where technically viable.

Another embodiment may be a method of preparing charcoal powder and cardanol products, comprising the steps: providing cardanol; providing charcoal powder; mixing the cardanol with the charcoal powder, such that a cardanol and charcoal powder composition is created; pressurizing the cardanol and charcoal powder composition; and curing the cardanol and charcoal powder composition. The method may include the step of providing a catalyst; wherein the catalyst is mixed with the cardanol and the charcoal powder, such that the cardanol and charcoal powder composition comprises the catalyst. The cardanol may be in a range of approximately 2% to 50% by weight of the cardanol and charcoal powder composition; wherein the charcoal powder may be in a range of approximately 10% to 98% by weight of the cardanol and charcoal powder composition; and wherein the accelerator/catalyst may be in a range of 0.1% to 15% by weight of the binder (cardanol) component; wherein the cardanol and charcoal powder composition may be pressurized (optionally with vibration) at a range of approximately 3 to 100 kN/cm2; wherein the mixture may be cured at a range of approximately 180° C. to 250° C. for 30 minutes to 2 hours.

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE EMBODIMENTS

Figure 1:
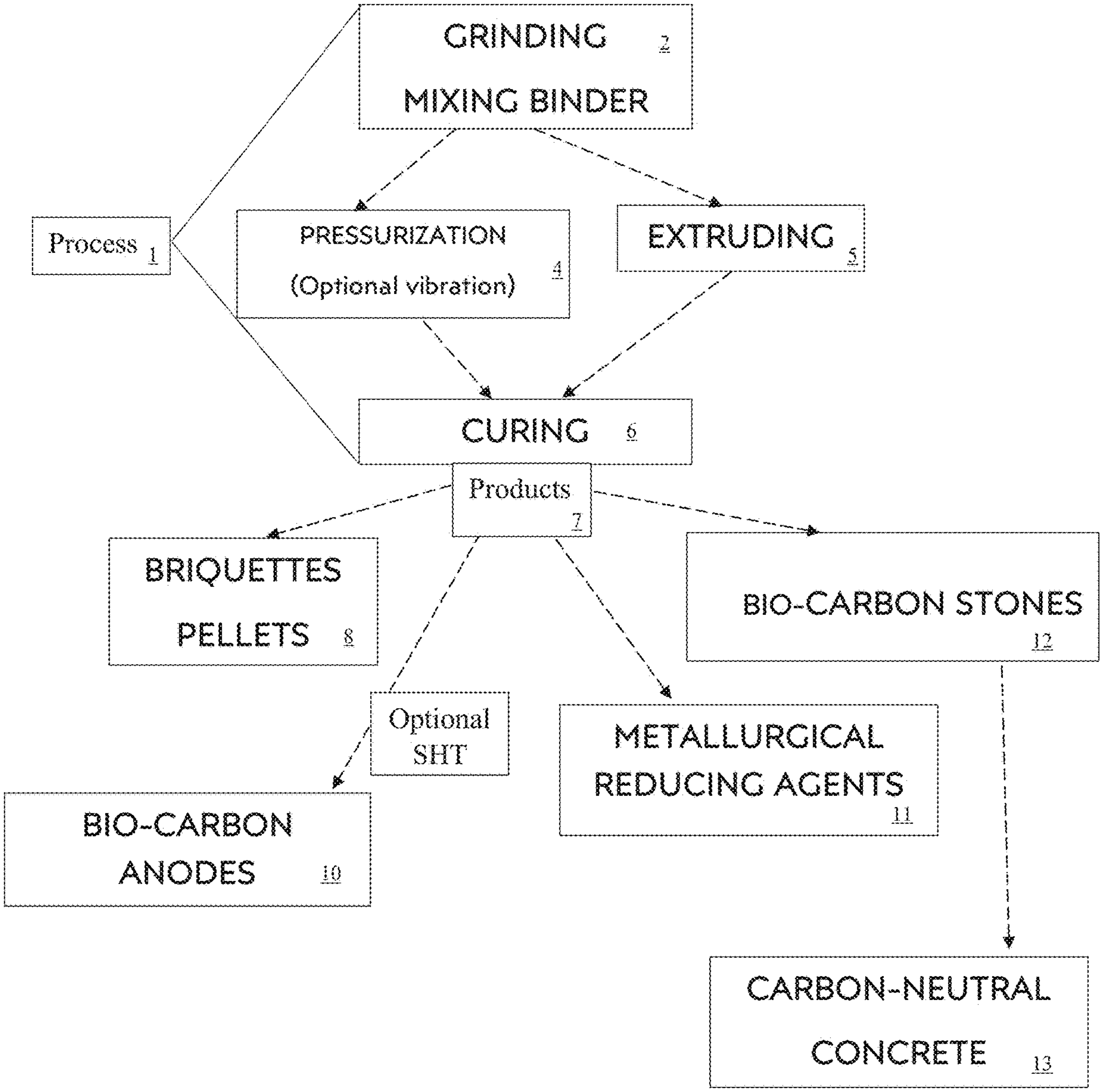
FIG. 1 is a flow block diagram of one embodiment of the process for creating bio-carbon material and products.

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, group of items, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, group of items, or result. In another example, substantially all of a group of items, may include all of the items of that group, or at least all of the items of that group that re generally within the normal parameters for the items. To the extent that the group of items might include members that far exceed the normal parameters, this abnormal item might not be expected to be part of substantially all the group of items.

As used herein, the terms "approximately" and "about" generally refer to a deviance of within 5% of the indicated number or range of numbers. Correspondingly, "substantially pure" or "consisting substantially of" will indicate that something is effectively pure but allows for a certain degree of impurity, such as less than 12%, less than 10%, less than 5% or less than 1% other material(s). In one embodiment, the term "approximately" and "about", may refer to a deviance of between 0.0001-39% from the indicated number or range of numbers.

As used herein, the term "charcoal" (sometimes referred to in the art as "biochar" and used herein equivalently such that "charcoal" herein may be read as "biochar") may be produced from any organic material undergoing carbonisation. Generally, charcoal/biochar is a solid, carbon-rich, material obtained from the thermochemical conversion of biomass in an oxygen-limited environment. Preferably the charcoal may be derived from any biomass, including, but not limited to, sugar cane, bagasse, straw, bamboo, nut shells and other nut byproducts (e.g. coconut shell or cashew nut shells and/or solid residues), rice husk, agricultural residues (e.g. agricultural waste), municipal waste, hard and softwoods. Any such materials, or any other organic material, may be the basis for the charcoal. An advantageous aspect of the present invention is the facility to use carbon captured from the atmosphere in order to reduce the net carbon released in producing the product and/or to sequester carbon from the atmosphere into a long-lived product such as concrete. In one embodiment, the charcoal (biochar) is therefore formed of biomass that was recently living (growing). This may be biomass which was growing (and thus taking carbon from the atmosphere) within the last 100 years (e.g. 1 week to 100 years before use) or within the last 50 years. For some forms of biomass (especially, for example, bamboo or crop residues such as straw or rice husk), the biomass may have been growing within the last 5 years (e.g. within the last 3 years or the last 1 year).

Preferably the charcoal used in the composition of the present disclosure is in the form of charcoal powder. "Charcoal powder" as used herein will typically have a weight average particle size of no more than 20 mm, such as no more than 8 mm in the largest dimension (e.g. 1 nm to 20 mm 1 nm to 8 mm, such as 100 nm to 8 mm or 1 μm to 8 mm). Preferably the charcoal powder will have a weight average particle size of no more than 2 mm (e.g. 3μ to 1 mm or 10 μm to 1 mm). The present inventors have found that smaller charcoal particles typically result in a stronger bio-carbon material and thus preferred charcoal powder sizes are no larger than 200 μm (e.g. 10 to 200 μm), preferably no more than 100 μm in largest dimension.

As used herein, the term "charcoal powder" refers to crushed or grinded charcoal, preferably of sizes indicated above. "Charcoal fines" is a waste product comprised of charcoal dust and small pieces created when processing charcoal for barbecue, the metallurgical industry, or any other application where charcoal is commonly used and may be used as the starting material for charcoal powder. Charcoal powder may be found as a residue from charcoal that is a soot black powdery substance normally found at the bottom of charcoal sacks or at charcoal production and/or packing sites. Charcoal fines are generally pieces of charcoal that are normally less than 40 millimetres in diameter. These are then crushed and/or ground into charcoal powder. Preferably, the charcoal powder used may have a diameter of less than 2 millimeter (as described herein).

The charcoal powder in the various embodiments of the present invention should be approximately 60% to 100% or 70% to 100% pure charcoal, with not more than approximately 40% or 30% carbon-based filler (by weight of the charcoal component). As used herein, the term "carbon-based filler" refers to, for example, coal, coke, anthracite, graphite, wood dust, sawdust, wood chips, wood powder, lignite, semicoke, petcoke, metallurgical coke, carbon fiber, and the like. This is in contrast to the optional "mineral filler" described herein. In one embodiment the charcoal component is pure charcoal or substantially sure charcoal.

Mineral fillers may be used as up to 40%, preferably no more than 30% by weight (as discussed above) of the bio-carbon material. Such fillers may be used for any purposes such as adding strength to the material, reducing the surface area or water absorption of the material and/or increasing the density of the bio-carbon material. Suitable fillers include rock flour (very fine rock particles such as those produced by drilling or grinding rock), silicon powder or fine sand. Granite flour is particularly suitable as in certain embodiments are carbonate minerals such as calcium magnesium carbonate (dolomite). Preferred mineral filler particle sizes may be in the range 1 nm to 100 μm, such as 1 to 20 μm or 3 to 1 μm.

In the bio-carbon materials of the present disclosure, at least 10% % (e.g. 10 to 98%) of the bio-carbon material by weight will be comprised of charcoal. This will preferably be at least 40% (e.g. 40 to 95%) by weight and more preferably 50 to 90% by weight. In one embodiment, such as for fuel and reducing agent uses where a low level of binder (e.g. 2 to 15 wt %) may be sufficient, the weight % of charcoal may be 75% to 98%, 75% to 95% or 80% to 90% by weight. In a further embodiment, such as for higher strength uses, such as "charcoal stones" (as discussed herein) and anodes for aluminium production, the binder content may be higher (e.g. 20 to 30 wt %) and the charcoal content may thus be lower (e.g. 70 to 80 wt %). Where a mineral filler is also included, the charcoal content may be 40 to 70 wt % or 45 to 60 wt %.

As used herein, "captured carbon" indicates carbon which has been removed from the atmosphere within the last 100 years or the last 50 years. This is typically by the growth of plants such as trees, bamboo or agricultural crops but may be by other means such as chemical methods. Captured carbon may be contrasted with "fossil carbon" which is derived from fossil fuels. If captured carbon is utilized in a way that releases that carbon as CO2 into the atmosphere, the net effect is simply to replace carbon that was previously in the atmosphere (e.g. was previously removed from the atmosphere by plant growth). This has an overall zero effect on the carbon content of the atmosphere and is known as "carbon neutral". Correspondingly, if captured carbon is sequestered away from the atmosphere for long periods (e.g for 100 years or more, such as 100 to 500 years) then the overall effect is "carbon negative" in that carbon has been taken from the atmosphere and not replaced.

As used herein, "carbon neutral" or "CO2 neutral" is the property of having net-zero carbon dioxide emissions. A product can be carbon neutral by balancing emissions of carbon dioxide associated with a process with the capture of a corresponding amount of carbon from the atmosphere. An imbalance of no more than ±20% or ±10%, preferably no more than ±5% in the weight of carbon released and absorbed is considered "carbon neutral" herein since exact measurements can be difficult. Correspondingly, a product is "carbon negative" if the carbon dioxide emissions associated with its production are less than the carbon dioxide absorbed from the atmosphere by the product itself. Generally herein, a product may be considered "carbon negative" if the weight of carbon captured from the atmosphere into the product is more than 10%, preferably more than 20% greater than the amount of carbon released as carbon dioxide in the manufacture of that product.

As used herein the term "bio-carbon" is used to indicate captured carbon which has been taken from the atmosphere within the last 100 years or last 50 years (preferably within the last 30 years) by biological processes, such as plant growth. Correspondingly, the "bio-carbon material" referred to herein is material comprising bio-carbon. In particular, the carbon content of the bio-carbon material should comprise at least 50% bio-carbon and preferably at least 80% bio-carbon. In some embodiments, the carbon content of the bio-carbon material consists essentially of or consists of bio-carbon as described herein. The use of bio-carbon is significant because it avoids the release or risk of release of fossil carbon (in the form of CO2) into the atmosphere. Bio-carbon (which is also referred to as "captured carbon") is also measurably different from fossil carbon at least in isotopic profile and can be distinguished from fossil carbon by radiocarbon methods. For example, the ratio of 14C in the atmosphere is around 1 atom of 14C in 1012 atoms of 12C and is similar for the terrestrial biosphere. Captured carbon may thus have an atom ratio of 14C: 12C of around 1:1012, such as between 1:1012 and 1:1013 or between 1:1012 and 1:1014. Carbon with an atom ratio of 14C: 12C of less than around 1:1015 is likely to comprise a high level of carbon which has not been in the atmosphere or biosphere for at least 50,000 years and so would not be considered "captured carbon" or bio-carbon herein.

In various embodiments of the present disclosure, at least one binder is utilized. Preferred binders include at least one phenolic resin. Phenolic resins are generated by the polymerization of at least one phenol, typically with or utilizing at least one aldehyde or formyl carbon source such as hexamine.

Phenols suitable for the formation of phenolic resin for use as a binder include those of formula I below:

I

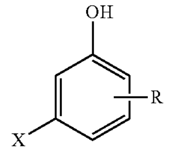

In formula I, X is H or OH and R is H or an optionally substituted, saturated or unsaturated, hydrocarbon moiety of 1 to 24 carbons, which may be straight-chain or branched. In one embodiment, the at least one phenol of formula I comprises at least one phenol wherein R is not hydrogen. R will typically be at the position meta to the phenolic OH group. Generally, unsubstituted phenol does not form the sole phenol for generating the phenolic resin as described herein.

Thus, generally, the phenolic resin will be formed from (i.e. be polymers of) at least one phenol wherein at least a portion of the phenols of formula I will have R as a moiety other than hydrogen. Preferably, not more than 60% (e.g. 1 to 50%) or not more than 30% by weight of the phenols of formula I will have R═H, preferably not more than 10% and more preferably not more than 1%. In one embodiment, the phenol(s) of formula I do not have hydrogen as moiety R. Typical examples of R include C1 to C24 hydrocarbons, such as C6 to C20 (e.g. C8 to C18 or C10 to C17) saturated or unsaturated hydrocarbons having straight or branched chains. Such hydrocarbon moieties may be saturated or unsaturated. Such unsaturations may be in the form of at least one double and/or triple bond within the hydrocarbon moiety, such as 1, 2, 3, 4 or 5 double bonds. Double bonds, where present, may be cis- or trans-double bonds. Preferably at least one cis double bond may be present in at least a portion of the phenols of Formula I. In one embodiment, 0, 1, 2 or 3 double bonds may be present and mixtures of two or more may be present in the phenols of formula I. Where the R moiety is a substituted hydrocarbyl moiety, this may be substituted with any appropriate group, such as Cl, F, OH, NH2 epoxy or other substituents. Amine and hydroxyl substituted compounds of formula I are particularly suitable. Epoxy substitution may also be used. In one embodiment, R is C15H31-n where n is 0, 2, 4 and/or 6.

In one embodiment, the phenolic binder may be a polymer of (e.g. formed or formable from) phenols of formula I comprising, consisting essentially of or consisting of cardanol and/or cardol. In one embodiment, the phenolic binder is formed or formable from phenols comprising at least 50% (e.g. 50% to 100%) cardol and/or cardanol (e.g. at least 70% or at least 80%, such as at least 90%).

As an alternative or partial alternative to pure phenolic resin binders, epoxy resins may be utilized. In particular, the phenols of formula I may be epoxidised using known methods such as epichlohydrin. For example, cardanol may be epoxidised as below:

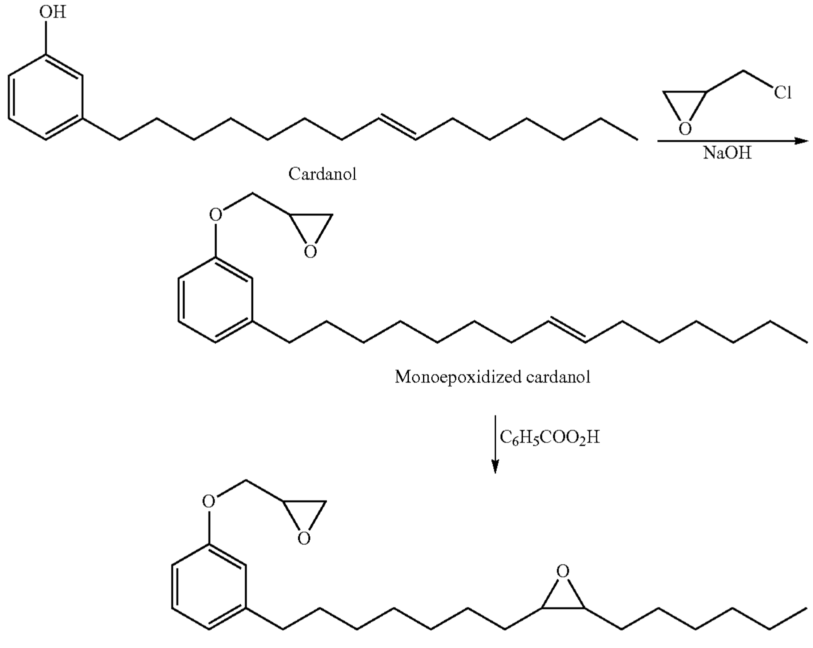

Cardanol

Monoepoxidized cardanol

Diepoxidized cardanol

Furthermore, the phenols of formula I may be formed into novalac-type phenolic resins by use of a formyl carbon source such as hexamine, as disclosed herein, and may subsequently be epoxidised and then further crosslinked by reaction of the epoxidised prepolymer:

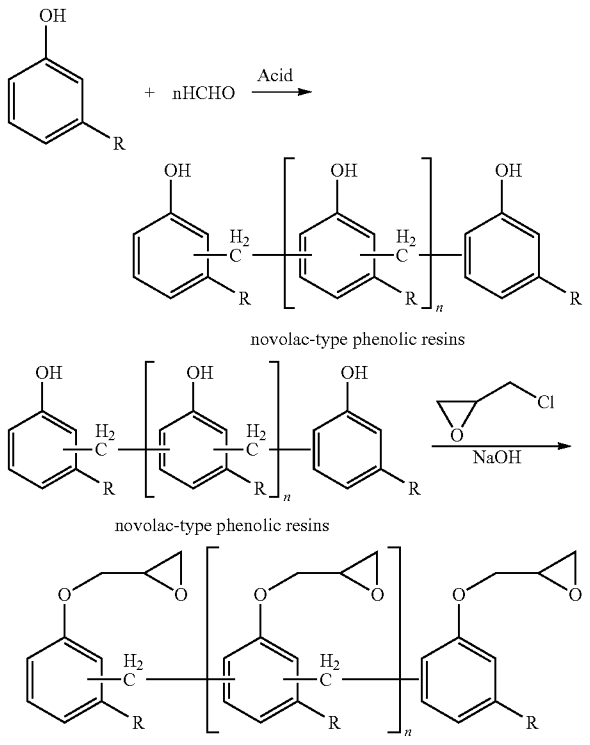

novolac-type phenolic resins novolac-type phenolic resins epoxy novolac resin

In an alternative embodiment, the phenolic resin does not comprise any epoxy groups and does not include any epoxidation step in the synthesis of the phenolic resin.

As used herein, the term "cashew nutshell liquid" or "CNSL" refers to the liquid that is a natural resin with a yellowish sheen found in the honeycomb structure of the cashew nutshell and is a byproduct of processing cashew nuts. Naturally occurring CNSL contains mainly four components: anacardic acid, cardanol, cardol, and 2-methyl cardol. These four components are monohydric or dihydric phenols or phenolic acids with a hydrocarbon sidechain at the meta-position. CNSL may be heat treated to decarboxylate the anacardic acids, producing a technical grade of CNSL that is rich in cardanol. Distillation of this material gives distilled, technical CNSL containing 78% cardanol and 8% cardol. In one embodiment, the phenols of formula I are around 78% cardanol and around 8% cardol (e.g. 75-85% cardanol and 5 to 15% cardol).

As used herein, the term "cardanol" or "cardanol oil" refers to the component of CNSL that has the molecular formula of C21H30O, C21H32O, C21H34O and/or C21H36O and the following structure:

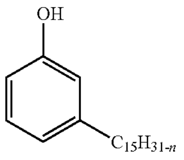

Where n is 0, 2, 4 or 6. Typically a mixture containing at least some n=6 is present.

Cardanol is a phenolic lipid obtained from anacardic acid, the main component of cashew nutshell liquid.

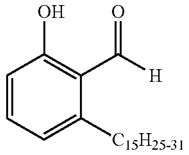

Anarcardic Acid

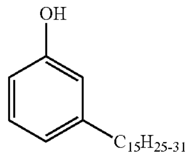

Cardanol

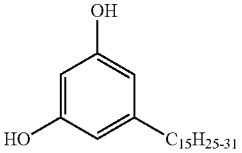

Cardol

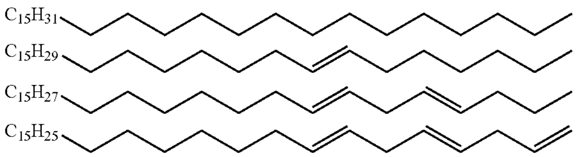

Some anarcardic acid (e.g. 0 to 20% such as 1 to 15% or 1 to 10% by weight) may be present in the binder.

Cardanol as a mixture of long-chain alkyl phenols having the C15 chains shown above (which correspond to group "R" in formula I and the structures herein) has CAS number 37330-39-5. Purified cardanol having R-group C15H25 as above is also available under the same CAS number. Either grade may be used in the various aspects of the present invention as all or a part of the phenols of formula I. In one embodiment, at least 50%, preferably at least 75% of the phenols of formula I consist of cardanol CAS 37330-39-5, such as the cardanol mixture indicated above.

In the bio-carbon materials of the present disclosure, the amount of binder component will typically be 5% to 30% by weight (as discussed herein). This may vary for different applications as is discussed above. Where the material is to form a "charcoal stone" the amount of binder will generally be at least 15%, (e.g. 12 to 30%), preferably at least 15% or at least 18% by weight. A maximum of around 25-30% binder is preferred as the material can lose binder when compressed if a greater amount is employed. However, as the particle size of the charcoal and/or filler may affect the maximum amount of binder, the upper limit will be readily determined for any specific charcoal powder and optional filler.

The binder component in the various embodiments of the present invention may comprise or consist of a phenolic binder. Such a binder may comprise or consist of polymers of phenols such as the phenols of Formula I as described herein. The method of forming the bio-carbon material of the disclosure may comprise mixing charcoal powder with the phenol(s) and other materials such as the optional accelerator (as described herein), forming the material into the desired shape, optionally compressing the material (as described herein) and curing the material (as described herein). The binder component may alternatively be in the form of a pre-polymer such as a "novalac" type resin (as known in the art and described above). This pre-polymer may be mixed with the other components including charcoal and optionally including additional phenol(s) and optional components such as accelerator(s), drying oils and/or filler(s). These various components are described herein. The pre-polymer mixture may then be cured by crosslinking such as by reaction with aldehydes or formyl carbon sources, by epoxy modification and crosslinking (see above) and/or by oxidative crosslinking (as is known for drying oils).

In one embodiment, at least 50% of the carbon present in the binder is captured carbon. This may be 50 to 100% or 50 to 98% or 70 to 99% by weight. Using binders comprising materials from natural sources (such as cardanol with or without cardol) increases the amount of captured carbon in the bio-carbon material and improves the carbon capture and sequestration properties. Binders utilising fossil carbon may be used as a full or partial alternative.

In one embodiment, the binder does not comprise lignin or comprises lignin in an amount of less than 1% by weight of the binder component.

As used herein, the term "pressurized" or "compressed" refers to the act of subjecting a mixture or composition to pressure. The pressure applied may be via a pneumatic press, mechanical press, electric press, extruder, roller press, and the like. Compression may take place once or may be carried out multiple times (e.g. 2, 3, 5 or 10 times). Multiple compression may provide a stronger product once cured. Whenever pressurizing or compression is referred to herein, this may optionally be accompanied by vibration, either sequentially or simultaneously.

CNSL and cardanol may be extracted and purified, using many different methods, including mechanical extraction, thermal extraction, solvent extraction (static, Soxhlet, ultrasonic, carbon dioxide), and pyrolysis. Mechanical and thermal extractions are favorable and are the most commonly used and commercially practiced. In one embodiment, CNSL is typically treated with high temperatures, which decarboxylates anacardic acid, yielding cardanol. Additional distillation of CNSL removes at least some of the cardol leaving the cardanol in pure or at least purer form.

As used herein the term "hexamine", which is also called urotropine, methenamine, hexamethylenetetramine, refers to a heterocyclic organic compound with the formula (CH2) 6N4. Hexamine is a white crystalline compound that is highly soluble in water and polar organic solvents. It is useful in the synthesis of other organic compounds, including plastics, pharmaceuticals, and rubber additives. It may also be used as an accelerator or catalyst. Other sources of formyl carbon may be used as accelerator, including those described herein.

Other catalysts & accelerators that may be used are cationic, ionic, and oxidizing agents that may accelerate the polymerization of the Cardanol when it is heated. Other alkalis may also be used as a catalyst.

Hexamine is a useful source of formyl carbons but other formyl sources may be used. These include formaldehyde and oligomers of polymethylene glycol such as formalin or paraformaldehyde. Other aldehydes may also be used.

Urea and/or urea derivatives (such as methylolurea) may also be used as accelerator alone or in combination with a formyl carbon source. Metal oxides such as magnesium oxide may be of value as a catalyst where urea or urea derivatives are included.

Phenolic resin binders (particularly those formed at least partially from cardanol) form one preferred embodiment of the present disclosure. Such phenolic binders may be formed by reaction of phenols, such as those of formula I herein with themselves (e.g. by oxidative cross-linking) or with accelerators such as hexamine or other formyl carbon sources. They may additionally be epoxidised either as monomers or as pre-polymers and cured with conventional epoxy curing agents such as amines (e.g. phenalkamines). In one particular embodiment, epoxidised phenols and/or phenol pre-polymers such as those indicated herein may be cured by or with the addition of ionic liquids. In particularly, phosphonium based ionic liquids may be used. In one embodiment, the phenolic resin is not an epoxy resin. For example, in one embodiment, the phenolic resin does not comprise any epoxy component (e.g. is not formed by epoxidation of the phenol or any pre-polymer). In one embodiment, the binder component may comprise, consist essentially (e.g. contain 90% to 100% by weight) of or consist of at least one phenolic resin.

As an alternative to phenolic binders, other binders may be utilized. In particular, in one aspect of the present disclosure there is provided a bio-carbon based material comprising charcoal and at least one binder where the bio-carbon based material has a compression strength of at least 30 MPa, at least 50 MPa or at least 60 MPa (as described herein) when tested as described herein such as to ASTM C39/C39M. Such a material is hard enough to be used as at least a partial filler in construction materials such as concrete and concrete comprising such a material forms a further aspect of the disclosure. As whole or partial replacement for the phenolic resin binder described herein may be utilized any appropriate binder in all proportions and embodiments described herein where technically viable. Such alternative binders include other polymers such as melamine or epoxy resins or inorganic binders. Suitable inorganic binders, such as polysialates, include water glass (e.g. sodium silicate) modified with nanoparticles of metal oxides. Such materials are described in EP3524372A1 which is incorporated herein by reference. Inorganic binder may be used in combination with organic binders such as the phenolic resin binders described herein.

In addition to the main (especially phenolic) binder, the bio-carbon materials and all corresponding aspects of the invention may also comprise an optional secondary binder. In one embodiment, the secondary binder serves to increase the "green strength" of the material, which is the strength after forming but before curing. The secondary binder may be any binder which serves to increase "green strength" of the mixture without compromising the strength of the cured product.

Examples of typical "secondary binders" include "drying oils" such as those discussed herein above including linseed oil, and polysaccharide binders such as alginate, guar gum or starch based binders. Starch binders may comprise any form of starch such as corn starch, wheat starch, potato starch, rice starch and any combination thereof. "Starch" in all examples includes "modified starch" such as modified corn starch, modified wheat starch, modified potato starch, modified rice starch and any combination thereof. "modified starch" is a well understood term in the art and includes physically, enzymatically, and/or chemically treated starch from any suitable source.

Particularly useful starch modifications include those which make starch soluble in cold water. These may include extrusion, drum drying, spray drying or dextrinization (roasting with HCl). In one embodiment, the secondary binder comprises cold-water soluble modified starch (e.g. from potato).

The secondary binder may be present in an amount of up to 50% (e.g 1 to 50%) by weight of the binder component or around 15% of the total bio-carbon material. This will preferably be 5 to 40% of the binder component or 10 to 35% (e.g. 15 to 30%).

In the methods described herein water may be used as a processing aid. This is particularly to serve as a lubricant in formation (e.g. extrusion, briquetting or peletisation) and may also assist in the incorporation of secondary binders such as polysaccharide binders (such as starch or modified starch). Where water is added to the mixture, this will typically be prior to the shaping of the product and will typically be removed by drying prior to curing of the binder. In one embodiment, the shaped "green" product (i.e. prior to curing) is dried at a temperature of 50 to 120° ° C. (e.g. 80 to 105° C.) for 10 minutes to 2 hours prior to the curing step. This drying step may be to reduce the water content of the green product to less than 10% by weight, preferably less than 8% or less than 5% by weight prior to curing. If high levels of water remain in the product at the curing step, the binder may not cure effectively and the properties of the final product may be inferior. Water used as a processing aid is not taken into account in the calculation of the wt % of components herein since this water is generally not present at a high level in the final product.

Specific Example Embodiments

Figure 2:
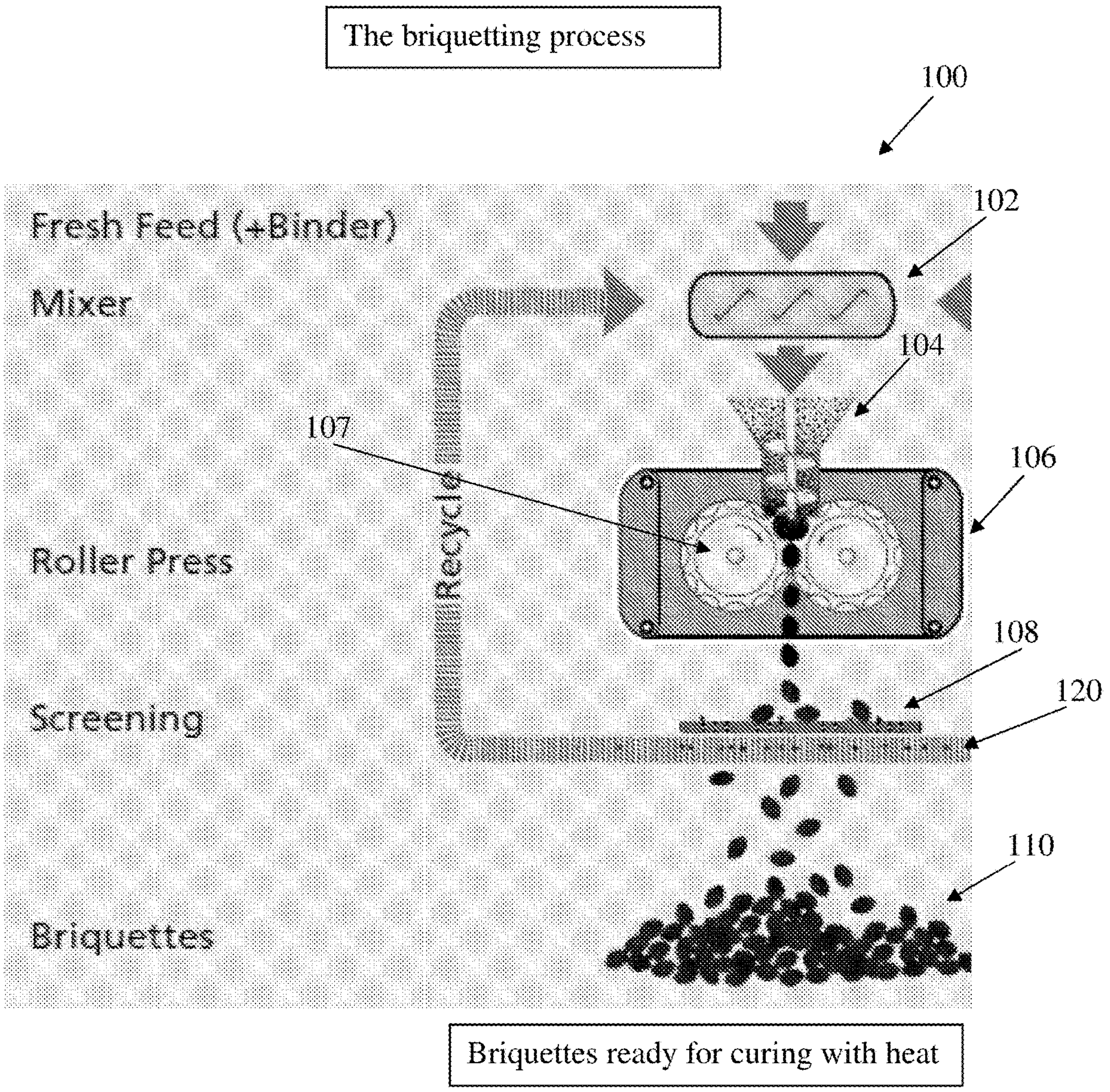
FIG. 2 is an illustration of one embodiment of the process for creating a charcoal powder and phenolic binder briquette.

One embodiment of the present disclosure may be a method, comprising the steps:

- providing at least one phenol of formula I (such as cardanol);
  - preferably in the range of approximately 2 to 50% by weight;
    - when the mixture has greater than approximately 50% by weight of binder (e.g. cardanol), the binder may seep or ooze out of the mixture when subjected to pressure (binder (e.g. cardanol) saturation happens at or about 50%);
    - as detailed in FIG. 2, the more binder in the mixture, the harder the resulting briquette or product;
  - more preferably, the binder (especially cardanol) may be in the range of 5 to 30% by weight of the final mixture;
- providing charcoal, preferably in the form of charcoal powder;
  - preferably in the range of 30 to 98% by weight;
  - in some embodiments, the charcoal may be grinded so that it is a uniform charcoal powder;
  - in some embodiments, the charcoal powder may be cut with up to approximately 30% carbon filler by weight of the charcoal powder (as described herein);
- mixing the binder (e.g. cardanol) with the charcoal powder to create a cardanol and charcoal powder composition;
  - in one embodiment, after approximately 10 minutes the composition is thoroughly mixed;
  - in some embodiments the charcoal may be cut with carbon filler of up to approximately 30%
- loading the binder and charcoal mixture into a die or other suitable vessel for pressurization;
  - alternatively, the mixture may be extruded or passed through a roller press, which may provide the pressurization;
- subjecting the binder (e.g. cardanol) and charcoal powder mixture to pressure;
  - in one embodiment, a hydraulic press may be used, but other pressure mechanisms may be used, including mechanical presses, extruders, or roller presses;
  - preferably, the pressure may be approximately 3 to 200 $N/cm^2$, and preferably at approximately 10 $N/cm^2$;
  - to increase compression strength, the composition may be pressed multiple times;
- curing the pressurized binder (e.g. cardanol) and charcoal powder composition;

- in one embodiment, the pressurized binder (e.g. cardanol) and charcoal composition is heated in an oven for approximately 1 minute to two (or more) hours;
- in one embodiment, the pressurized binder and charcoal composition is cured in an oven at less than 450 degrees C., and preferably in the range of approximately 180° C. to 250° C.;
- the curing may be done via direct heat, indirect heat, radiant heat, ultraviolet light/rays (UV), infrared rays (IR), microwaves, ultrasound, inductive power, and the like.

The cured binder and charcoal powder composition (bio-carbon material) may be used as an industrial or BBQ briquette.

The cured binder and charcoal powder composition (bio-carbon material) may be used as a total or partial replacement for rocks, stones, or other filler commonly used in concrete and if desired, without reducing the overall strength of the concrete. Such usage may lower the carbon footprint of the concrete. Such use may make the concrete carbon-neutral or even carbon-negative with respect to the carbon released in manufacture of the concrete.

The cured binder and charcoal powder composition (bio-carbon material) may be used as a metallurgical reducing agent and/or as an anode for use in, for example, aluminum manufacturing;

- preparing the anodes typically requires heating to high heat temperatures, which is defined at temperatures greater than 1000° C.

The resulting compression strength of the binder and charcoal products (especially cardanol and charcoal products) of the present disclosure was a pleasant surprise. Indeed, even as low as 18% binder, the resulting cardanol and charcoal products are as hard as certain grades of concrete, and thus, can be used as such, including as a construction material or as a composite material. For such uses, binder levels around 18 to 30% are preferred. Because the binder percentage can be varied, the hardness and strength of the resulting products may be customized; One embodiment of the present disclosure may be a method, comprising the steps:

- providing a phenolic binder (e.g. cardanol);
- providing charcoal, preferably in the form of charcoal powder;
- providing a catalyst in the binder;
  - wherein the catalyst may be hexamine or another source of formyl carbon or aldehyde;
  - that catalyst may be any cationic, ionic, oxidizing agent or alkalis that accelerates the polymerization of the binder (e.g. phenol such as Cardanol) when it is heated;
  - in one embodiment, hexamine is added at approximately 6-8% by weight of the phenol (e.g. cardanol) that is added;
- mixing the phenol (cardanol), the catalyst, and the charcoal to create a composition;
- pressurizing (and optionally vibrating either simultaneously or sequentially) the composition;
- curing the composition;
- optionally, processing the cured phenol, catalyst, and charcoal composition to create briquettes which may be used as an ingredient in concrete, metallurgical reducing agents, as a fuel for cooking in the BBQ industry, and/or anodes for use in, for example, aluminum manufacturing;
  - preparing the anodes typically requires heating to high heat temperatures, which is defined at temperatures greater than 1000° C. Typical conditions for traditional petroleum coke and pitch anodes are 1100° C. for 200-300 hours.

The higher the content of cardanol and catalyst, the stronger the resulting material (e.g. briquette). The higher the content of cardanol, the more water resistant the material (e.g. briquette) is.

In one embodiment, the bio-carbon material (e.g. briquette) as described herein may be waterproof or substantially weatherproof and can be stored outside in the elements. In one embodiment, the bio-carbon material (e.g. briquette) as described herein may be waterproof to the extent that the material will not crumble or lose its structure after immersion in water for 24 hours, preferably 48 hours, more preferably 7 days. Preferably, the bio-carbon material (e.g. briquette) as described herein may take on 5-10% by weight of water and may be exposed to without there being any structural weaknesses of the material.

In one embodiment, the bio-carbon material (e.g. briquette) as described herein is sufficiently strong that it can be loaded, transported, unloaded and stored in bulk with similar equipment and practices commonly used today in the manipulation and storage of coal, petcoke, metcoke and gravel.

Preferably, the briquettes of the present disclosure are not likely to self-ignite during transportation or storage.

Prior to the compositions and methods of the present disclosure, the volatile organic compounds and gasses within charcoal are in the range of approximately 0-30% weight by volume. Cardanol is a preferred binder for use in the various aspects of the present invention. Cardanol has approximately less than 1% volatile organic compounds after purification and distillation of the CNSL. Accordingly, Cardanol is not only environmentally friendly, but it is non-volatile and essentially harmless.

In one embodiment, the pressurization (compression) may be done at standard pressure (approximately 1 bar or approximately 0.1 MPa).

In one embodiment, curing may take place in an inert, standard atmosphere.

For SHT, an inert atmosphere will be used and the temperature may be increased to in the range of 700 to 1300 degrees C. With approximately 1000-1100° C. being an optimal temperature (in an inert atmosphere). Curing and SHT may be conducted in a single heating step or may be carried out sequentially.

When cured in an oxygen rich atmosphere with no added pressure, the curing temperature may be lowered to approximately 400 degrees C. and below (as described herein) below 300° C. or below 200° C. are preferred.

In one embodiment, the bio-carbon material has at least the compression strength of a standard pet-coke anode, which has a flexural strength of approximately 8-10 MPa, a compression strength of 30-50 MPa, and a static elasticity modulus of 4-5.5 GPa (gigapascals). Thus, the products of the present disclosure have all of the same minimum technical requirements as pet-coke anodes but are formed from bio-carbon. The bio-carbon materials are thus also carbon dioxide neutral.

The drawings show illustrative embodiments of products created by the methods of the present disclosure, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

FIG. 1 is a flow block diagram of one embodiment of the process for creating charcoal and cardanol products. As shown in FIG. 1, Process 1 is used to create the composition, which may then have several different usable Products 7. Cardanol is combined with charcoal, in this case charcoal powder, and mixed at the grinding and mixing stage 2. If needed, the charcoal may be grinded to create a uniform charcoal powder. Preferably, the charcoal powder particles are sized as described herein such as approximately 1 nm to 1 millimeter in diameter, but bigger pieces may be used. The mixture may be transferred to a mold, die, vessel, or pressurization device that provides Pressurization 4 or Extrusion 5 to the mixture. The pressurized/extruded mixture may then be subjected to Curing 6, which is typically an oven or other device that provides a cure to the mixture. The resulting cured and pressurized mixture may then be further shaped, processed, or cured as desired. In one embodiment, the resulting composition may be used as an industrial or BBQ briquette 8. In one embodiment, the product may be broken down into smaller pieces or "carbon stones" (also termed herein "bio-carbon stones" or "charcoal stones") 12. These may be used as a raw material or in concrete, for example, such as "carbon neutral" concrete 13. In one embodiment, the product may be used as a reducing agent 11 or processed into anodes 10, optionally by curing by Second Heat Treatment at over 1000° C. (in an inert atmosphere).

FIG. 2 is an illustration of one embodiment of the process for creating a charcoal powder and cardanol briquette. As shown in in FIG. 2, the process 100 for manufacturing a charcoal and cardanol briquette may comprise providing charcoal powder and cardanol and mixing them in mixer 102. Alternatively, other compounds may be added, such as hexamine, or another type of catalyst. The mixture may then be transferred 104 into processor 106. The processor 106 may exert pressure on the mixture to harden and/or form it into a specific shape. FIG. 2 shows how the mixture may be extruded via a roller press 107. The briquettes 110 may be screened 108 and the residue material 120 may be recycled back into the mixer 102. FIG. 2 shows that the briquettes 110 may be pillow shaped. In a preferred embodiment the briquettes 110 may be cured using heat or some other curing source, such as UV, IR, microwaves, ultrasound, inductive power, direct heat, indirect heat, radiant heat, and the like.

Figure 3:
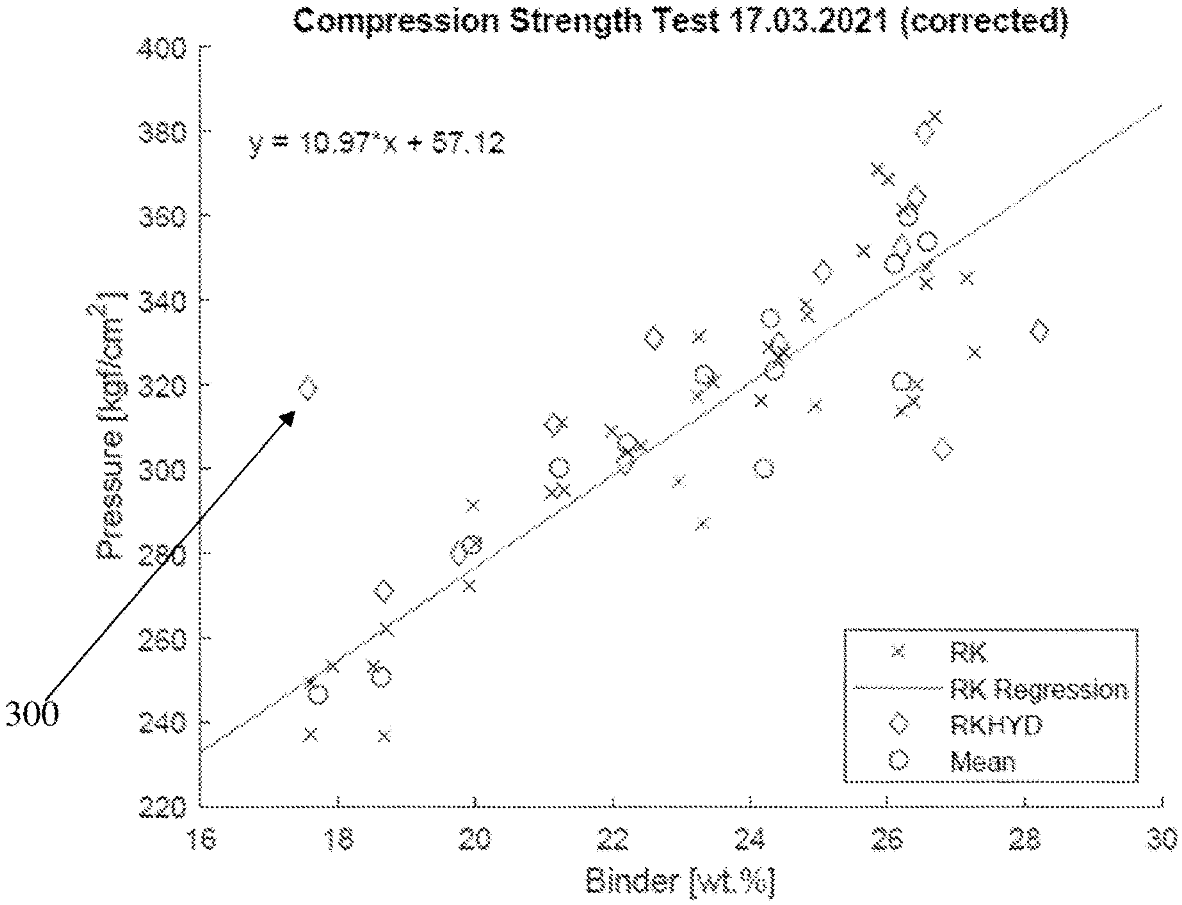
FIG. 3 is a graph that shows that, when using cardanol as the phenol forming the phenolic binder, in certain formulations, the more binder that is added, the stronger the resulting product is (within certain limits).

FIG. 3 is a graph that shows that the more cardanol that is added, the stronger the resulting product is. The graph shows the results of multiple compressive strength tests, where briquettes of varying compositions where subjected to known pressure to determine their strength. The briquettes made were all pressurized the same and subjected to the same curing process. The briquette related to data point 300 on the graph was pressed twice, turned upside down and then pressed again, all at approximately 100 MPa. This additional pressing led to that briquette being stronger. In general, the other briquettes were pressed once at approximately 100 MPa. RK is a charcoal powder, cardanol, and hexamine based briquette made from the methods of the present disclosure. RKHYD is the same briquette, but with added slagged lime at 5% by weight of weight of the composition. As shown, when additional pressure is applied, the strength of the briquettes is greater.

As shown in FIG. 3, the cardanol, "Binder", was added at 16% to 28% by weight. The pressure, presented in kilogram force per centimeter squared (kgf/cm2), ranges from 220 to 400. At just under 18% cardanol, the pressure was approximately, 240 kgf/cm2, this is well above the 140 kg/cm2 strength of standard metallurgical coke. The briquette surface area is 8.04 cm2, and at just under 18% cardanol, it failed at approximately 240 kg of force, which is equal to 2.5 metric tons pressure. As the percent by weight of cardanol is increased, FIG. 3 shows that the strength of the briquettes increases as well.

Figure 4:
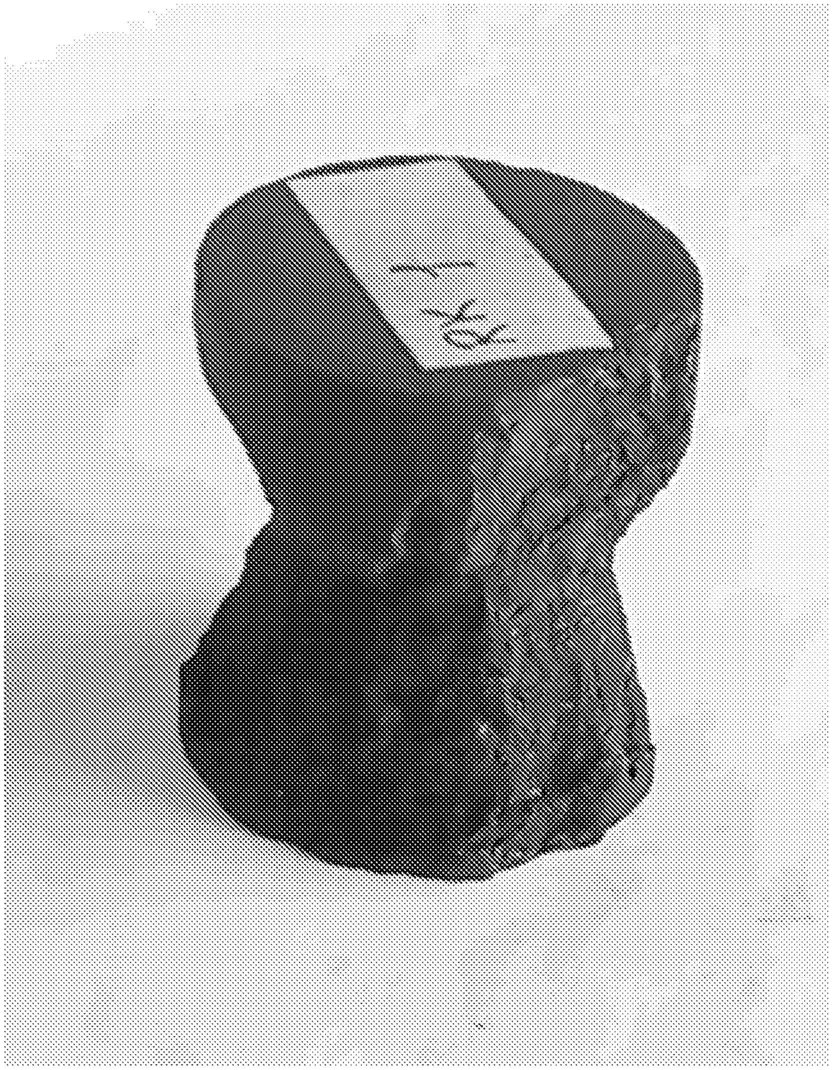
FIG. 4 is a photograph of a cylinder of bio-carbon material of the present disclosure after compression strength testing.

FIG. 4 is a photograph of a cylinder of bio-carbon material of the present disclosure after compression strength testing. The "hourglass" break pattern observed is a common break pattern in concrete but is not typically seen in other charcoal materials. This may indicate a high degree of compatibility between the bio-carbon materials of the disclosure and concrete.

Figure 5:
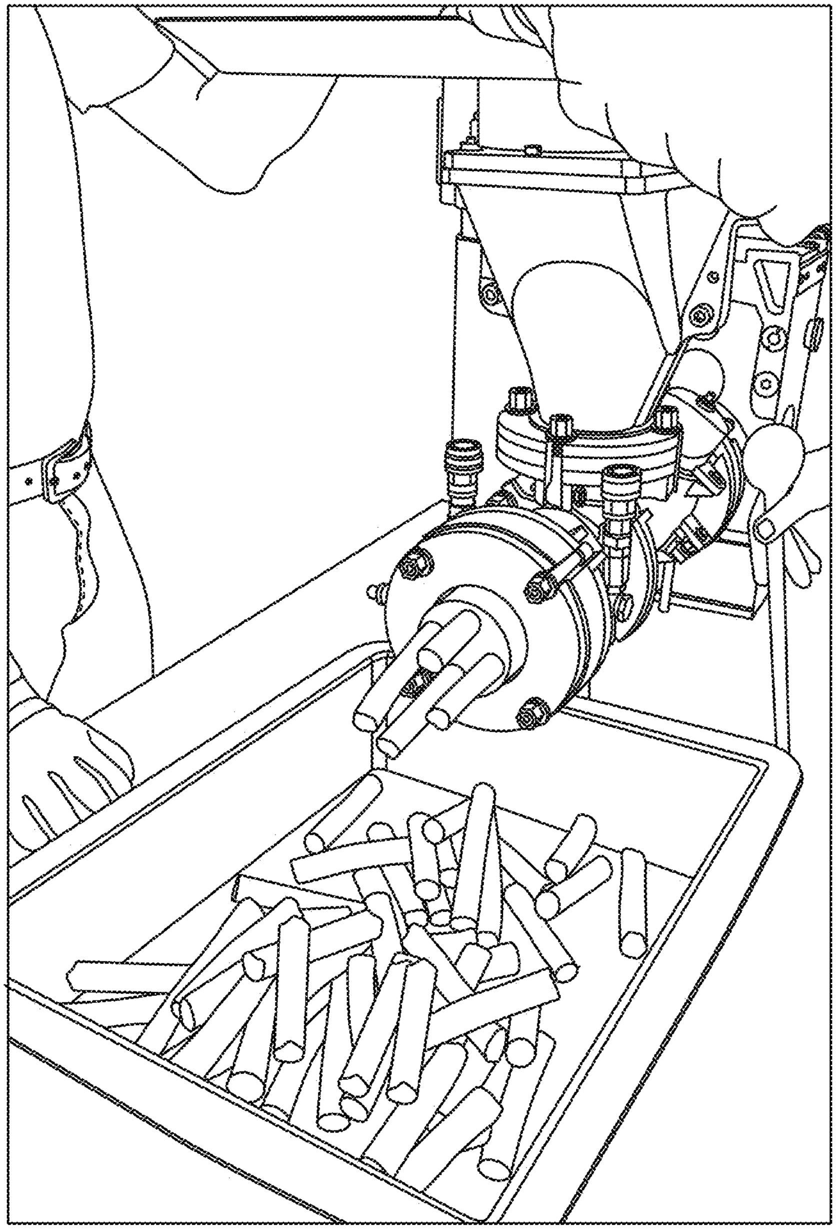
FIG. 5 is a photograph of the extrusion of bio-carbon material formed with a binder comprising a phenolic resin and a secondary binder of potato starch modified to be cold-water soluble.

FIG. 5 is a photograph of the extrusion of bio-carbon material formed in the method of Example 5. The extruded "rods" visible in the photograph have high "green strength" attributable at least in part to the inclusion of a secondary binder. In the example pictured, potato starch modified to be cold-water soluble was used as a secondary binder. It can be seen that the rods have tolerated a fall from the extruder into the collection tray without any significant loss of form. Such "green" material is therefore strong enough for manual and automated handling on conveyors etc. prior to curing.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

The invention will be illustrated further below by reference to the following non-limiting examples:

Example 1—Formation of Charcoal Items with Phenolic Binder

Charcoal was ground in a laboratory grinder to generate charcoal powder. The charcoal powder was passed through a sieve of 1 mm in width and 2 mm in length mesh size (the holes in the sieve is oblong in shape) to provide particles no larger than 100□m.

The charcoal powder particle sizes were measured by laser using a Mastersizer 3000E laser size analyzer. The particles were found to have a distribution from 10 □m to 100□m.

For making briquettes having ≥30 MPa in strength 30 g of technical grade cardanol was mixed with 2.4 g of hexamine and 100 g of the above charcoal powder. The mixture was stirred for around 5 minutes until moist but not wet. In total the binder (cardanol+hexamine) was 24.4% of the total weight of the mixture.

20.5 g of the moist mixture was transferred to a 32 mm internal diameter die and pressed with a lab. hydraulic press with a force of 10 kN/cm2 to form green tablet blocks/briquettes. A repeated pressing was found to improve the strength of the final product.

The green tablet blocks/briquettes were cured in an oven at 200° C. for 2 hours before cooling in ambient air.

Example 2—Strength Testing

Charcoal blocks prepared as described in Example 1 were allowed to cool fully and tested for compression strength according to the following method:

A cylindrical tablet block/briquette 32 mm in diameter and 25-30 mm in length was placed in a hydraulic machine attached to a computer measuring the compression strength.

The force exerted on the block/briquettes was increased linearly, equal steps at a rate of 100 N per minute until failure. The maximum force at failure was noted ≥30 MPa.

Typical "hourglass" break pattern observed for the bio-carbon cylinder is shown in FIG. 4. This is a pattern common in concrete cylinders but not previously seen in charcoal materials. This indicates that the bio-carbon materials exhibit a similar response to compressive stress to that seen in concrete, indicating potential high compatibility between concrete and the bio-carbon materials.

Example 3—Water Resistance Testing 10 briquettes of bio-carbon material were each weighed and placed in a closed bottle of water. The briquettes were each soaked for 12, 24, 48 and 72 hours before removal and re-weighing. No briquette exceeded 5% increase in mass after soaking in water. Furthermore, when the briquettes were placed in a tumbler and tumbled for 30 minutes following immersion, no weakness in the briquettes was found.

Example 4—Formation of a Phenolic Pre-Polymer

Phenol (8 kg), technical cardanol-technical grade (Rishabh Resins & Chemicals, Telangana, India, 2 kg), formaldehyde (37% solids, 10 kg), liquor ammonia (25% solids 450 g) and methanol 5-6 kg, is charged into a reactor. The reactor is heated to 60-70° C. and maintained at a temperature of 70-100'C for 30 minutes. Water is refluxed back into the reactor and heating maintained for 60-70 minutes until a pre-polymer with a gel time of 120-140 seconds on a hotplate is achieved. Water is then removed by vacuum distillation maintaining the reaction at no more than 90° C. When sufficient water has been removed the mixture is cooled and diluted as required with methanol. The pre-polymer may be used as whole or partial replacement for the cardanol in Example 1.

Example 5—Use of Phenolic Binder and Modified Starch Secondary Binder

Charcoal from Norwegian Birch was prepared by vacuum paralyzing at 650° C. (fixed carbon 94.3%, ash 1.9%, volatiles 3.8%) was ground in a free-standing hammer-mill to generate charcoal powder.

Charcoal powder 64.8% (all parts by weight), modified starch (Empre KST cold-water soluble modified potato starch, Emsland, Germany) 5% and hexamine 1.6% were thoroughly mixed as dry powders in a high-speed industrial mixer. Once the powders were mixed, cardanol 10.6% and water 18% were added and the mixture introduced to an extruder.

15 mm rods were extruded and cut to a length of around 200 mm. The rods were found immediately to have sufficient "green" strength for manual and automated handling without loss of shape. The extrusion process is pictured in FIG. 5.

The extruded rods were then dried by a 2-step drying process of initial drying at 105° C. until the entrained water was removed (approx. 2 hours) followed by curing at 150-200° C. for 1-2 hours (e.g. 2 hours at 200° ° C.).

Following curing, a 200 mm rod of 15 mm diameter was too strong to be broken by hand.

Example 6—Use of Phenolic Binder and Secondary Binder—Alternative Mixing

The production method of Example 5 was repeated but rather than mixing the dry components initially, an "all-in" mixing method was adopted. All ingredients (wet and dry ingredients) were added together and thoroughly mixed in a high-speed industrial mixer.

The mixed material was then transferred to the extruder and extruded to form 15 mm by approximately 200 mm rods.

After drying and curing as in Example 5, the "all-in" mixed material exhibited the same properties of strength and hardness as the two-step mixing of Example 5.

Note that the ratios (wt %) of the materials excluding water (which is used only as a processing aid) are: Charcoal powder 79%, cold-water soluble modified potato starch 6%, hexamine 2%, cardanol 13%.

What is claimed is:

1. A bio-carbon material having a compression strength of at least 5 MPa according to the ASTM C39/C39M method comprising:

a charcoal; and one or more binders;

wherein said one or more binders comprise a phenolic resin;

wherein said phenolic resin is a polymer consisting of one or more phenols and an accelerator and/or catalyst;

wherein said one or more phenols consists essentially of at least one of a cardol, a cardanol, or a combination of both thereof, each derived from cashew nut shell liquid;

wherein said accelerator and/or catalyst is present in an amount of 0.1 to 15% by weight of the binder; and wherein said bio-carbon material is 50 to 90% by weight said charcoal.

2. The bio-carbon material of claim 1, wherein said accelerator and/or catalyst consists of a formyl-carbon source.

3. The bio-carbon material of claim 1, wherein said one or more binders consists of said phenolic resin.

4. The bio-carbon material of claim 1, wherein said one or more binders are 5 to 30% by weight of said bio-carbon material.

5. The bio-carbon material of claim 1, wherein said bio-carbon material is cured to a temperature above 1000° C. in an inert atmosphere, in order to form one or more anodes that are configured to be suitable for use in a metallurgical industry.

6. The bio-carbon material of claim 1, wherein said one or more binders are 2 to 50% by weight of said bio-carbon material.

7. The bio-carbon material of claim 2, where said formyl-carbon source is hexamine, formaldehyde, and/or oligomers of polymethylene glycol.

8. The bio-carbon material of claim 1, further comprising:

a mineral filler; wherein said mineral filler is 1 to 30% by weight of said bio-carbon material.

9. The bio-carbon material of claim 1, wherein said bio-carbon material is configured to be part of a concrete material.

10. The bio-carbon material of claim 1, wherein said bio-carbon material is configured to be part of an anode.

11. A concrete material having a compression strength of at least 30 MPa according to the ASTM C39/C39M, comprising: the bio-carbon material of claim 1; and at least one of a sand, a cement, one or more stones, or combinations thereof.

12. An anode comprising: the bio-carbon material of claim 1; wherein said bio-carbon material is heat-treated and formed into said anode.

13. The bio-carbon material of claim 1, wherein the phenol does not comprise any epoxy group.

14. The bio-carbon material of claim 7, where said oligomers of polymethylene glycol are formalin and/or paraformaldehyde.

* * * * *